Dec. 17, 1957 R. PISONI 2,816,344
PLANT FOR THE CONTINUOUS COOLING OF LAUNDRY SOAP
Filed Oct. 13, 1954 2 Sheets-Sheet 1
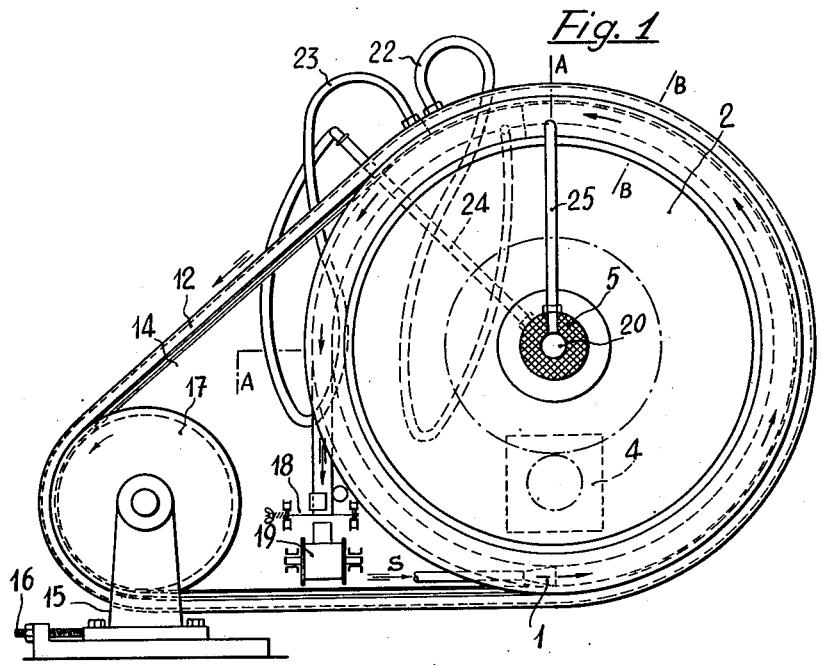
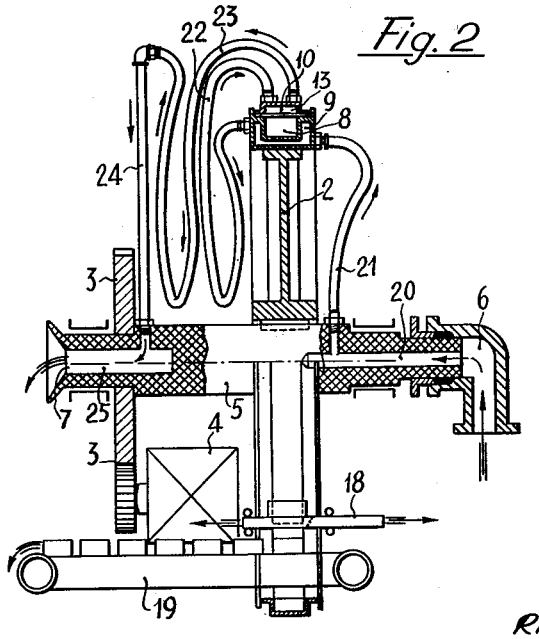
INVENTOR:
Rino Pisoni Dec. 17, 1957 R. PISONI 2,816,344
PLANT FOR THE CONTINUOUS COOLING OF LAUNDRY SOAP
Filed Oct. 13, 1954 2 Sheets-Sheet 2
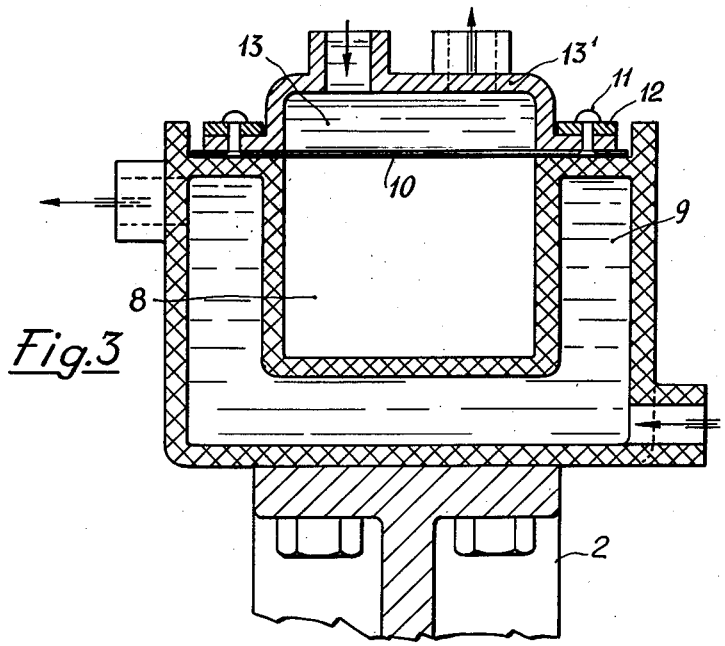
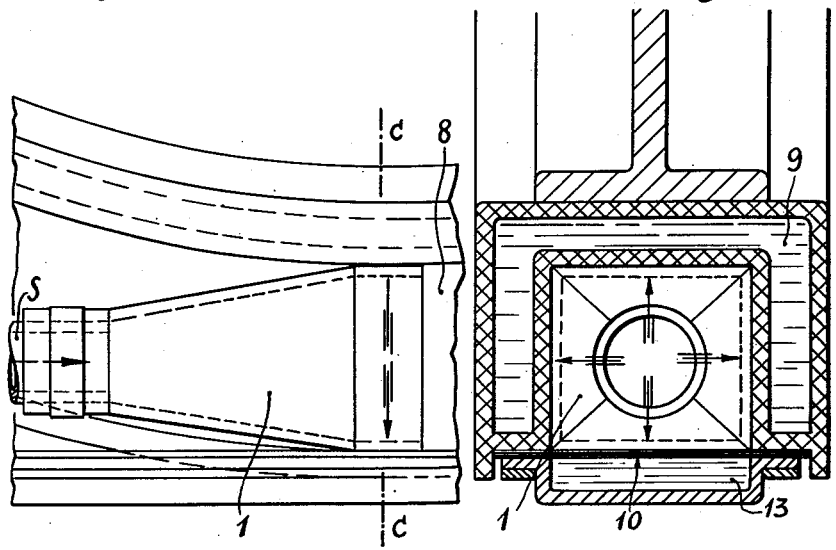
INVENTOR:
Rino Pisoni,
BY

United States Patent Office 2,816,344
Patented Dec. 17, 1957

2,816,344

PLANT FOR THE CONTINUOUS COOLING OF LAUNDRY SOAP

Rino Pisoni, Busto Arsizio, Italy

Application October 13, 1954, Serial No. 462,057

5 Claims. (Cl. 25—8)

It is known that the last part of the processing of soap, that is to say the transformation into solid and compact pieces by cooling under pressure, is performed either intermittently in machines which are therefore uneconomical and which require large cooling plants, or continuously in plants of complex design and expensive operation.

The present invention relates to a plant which produces continuously laundry soap in bars of the desired size following a quick cooling and compression.

According to the present invention a plant for transforming soap in a liquid warm state into a compact chilled bar comprises a rotatably mounted motor driven disc like member provided at its periphery with an annular duct of channel section with a jacket enclosing the three sides thereof, an endless flexible sealing strip partly encircling the annular duct so as to form therewith an arcuate refrigerating mould of rectangular cross section, said strip having a jacket on its outer face and passing over a return pulley, means by which a refrigerant can be supplied to the jackets of the annular duct and strip and means by which warm liquid soap can be continuously introduced to one end of the arcuate refrigerating mould. The arrangement and construction are such that when the disc like member is being rotated and refrigerant is being supplied to the jackets, warm liquid soap fed continuously under pressure to one end of the arcuate mould is carried round by the disc like member, is cooled by contact with the three sides of the duct and by the strip contacting therewith and is discharged from the other end of the arcuate mould in the form of a solidified bar.

The accompanying drawings illustrate schematically and by way of example a specific embodiment of plant according to the invention.

In the drawings:

Fig. 1 is a side view of a refrigerating unit.

Fig. 2 is a section of same along line A—A of Fig. 1.

Fig. 3 is a large scale cross-section along line B—B of Fig. 1.

Fig. 4 is a fragmentary elevational view of a nozzle for introducing the soap in the refrigerating duct.

Fig. 5 is a section of said nozzle along line C—C of Fig. 4.

The unit shown in Figures from 1 to 5, comprises: a stationary pipe S terminating in a nozzle 1 (Fig. 1) for the feed of liquid, warm soap under pressure, to a refrigerating duct in the machine unit illustrated, as well as a rotating disc 2 carrying the refrigerating duct. A gear transmission drive 3 imparts drive from a variable speed motor or a variable speed gear box 4 to the rotating disc 2 so as to allow a higher or lower rotational speed of the disc 2. Said speed of rotation is dependent from the cooling time required for a given size of soap bar.

Said duct carrying disc 2 is secured on a shaft 5 (Fig. 2) at whose ends are the inlet and outlet openings 6 and respectively 7 for the refrigerating liquid.

On said shaft there can be mounted one or more such discs 2, according to the hourly production capacity it is intended to achieve.

At the periphery of the disc 2 there is fixed the duct 8 (Figs. 2–3) (into which the soap is forced and cooled) surrounded on three sides of its section by a jacket 9 for the circulation of the cooling liquid which may for example be brine.

The fourth side of the duct 8 is closed by a steel strip 10 whereon there is fixed, for instance by means of rivets 11, and the interposition of a shim 12 of synthetic resin, a rubber canal or jacket 13 for the passage of the cooling brine. Said strip encloses and surrounds for a certain length of ore the duct 8 arranged on the disc 2 and is kept adherent to same so that the arcuate mould is tightly sealed. The soap to be cooled is fed by the nozzle 1. In order to obtain the necessary adherence of the steel strip against the canal on the disc 2, the said strip is arranged in the way of a belting constituting a closed circuit wound on the disc 2 and on the return pulley 17. The tensioning of this strip is obtained by suitably adjusting the position of the standard 15 of the pulley 17 by means of a screw 16.

The pulley 17 is supported on one side only by the standard 15 so as to allow the passage of the flexible conduits or hoses hereafter described, which conduits or hoses feed the refrigerant brine to the jacket 9 of the duct 8 carried on the disc 2, and to the jacket of the steel strip forming the fourth wall of the arcuate mould.

As is apparent from the drawing, the flow circuit for the refrigerating brine comprises ducts inside the rotating shaft 5, as well as flexible connecting conduits or hoses between the first and the second jackets 9 and 13. More precisely, as shown in Figs. 1 and 2, inside shaft 5 there is seen first a duct 20, which ends at a certain point of the said shaft, and is connected at one side to the feed duct 6 for said brine, and on the other side to a conduit or hose 21 terminating at the jacket 9. From said jacket, at another suitable point there branches out the flexible conduit or hose 22 that puts in communication the jacket 9 with the inside of the jacket 13, through a connecting tap provided on the outer surface 13' of same. From this same surface 13', at another suitable point there is provided another hose 23 connected at its other end to the rigid pipe 24, mounted on the shaft 5, and communicating with the bore or duct 25, whose outlet opening 7 has already been mentioned. Transverse baffles are provided in the jackets to ensure that the cooling liquid or refrigerant will circulate therethrough. It is then clear how the cooling brine, when the machine is in operation, flows in series through the duct 20, the hose 21, the jacket 9, the hose 22, the jacket 13, the hose 23, the pipe 24 and finally reaches the chamber 25 to discharge through the outlet opening 7. The connection of the two jackets and the feed ducts by means of flexible hoses allows the desired circulation and the rotation of the disc 2, as well as that of the strip 14 and the fact that the shaft of the pulley is supported at one side only allows the operation of the whole system without danger of the hoses 22 and 23 being subjected to dangerous torsion or being hindered in their motion so as to endanger the operation of the plant.

In Figure 2 it is clearly illustrated how the strip 10 constitutes a tight sealing for the duct 8 inasmuch as said strip 10 is wound under a suitable tension on the periphery of the disc 2, carrying the duct 8, and therefore between the edges of the strip 10 and the circular wall of the disc 2, lateral to the duct 8, there is achieved a perfect contact and hence a tight sealing for the liquid soap being introduced in the said duct 8. The pressure adherence between the strip 10 and said surface is ensured by the possibility of adjustment of the support 15 of the pulley 17, which will always be met so as to maintain the annular strip 14 under the desired tension.

Figures 4 and 5 illustrate the nozzle for feeding the soap in the duct 8, that at the same time functions as a tight connection between the stationary pipe S and the rotating duct 8 of the disc 2. Said nozzle 1, in the form of a pyramidal frustrum, is made of a flexible and elastic material, so that when liquid material flows through under pressure, such as the soap that is fed to the machine, it is forced to expand and therefore to make a perfectly tight contact between the terminal part of said nozzle and the walls of the said duct 8.

The operation of the machine described above is as follows: In the closed space constituted by the duct 8 and the strip 10, there is introduced, through the pipe S, liquid warm soap under pressure, coming from the cooking tanks or other reservoirs, the pressure being applied to said liquid by a pump or by means of compressed air acting in the said tanks or other reservoirs, in which said liquid soap is made to pass. At the same time, the disc 2 is made to rotate in order to facilitate the filling of the duck 8, and since the jackets 9 and 13 are cooled through the circulation of refrigerating water or brine, the soap is chilled while it is forced to pass through the duck 8, having the desired cross section. During its path it is being intensely and quickly chilled (there being four cooling walls) thus solidifying while maintained at the desired pressure.

Naturally, in order to prevent the soap which has yet solidified flowing out of the duct when it passes beyond top dead centre, the mouth of the duct, at the commencement of the operation of the machine, will be closed by a wooden plug or the like to insure that the soap is kept in the duct for all the time in which it will have to stay there for cooling.

When the soap has covered three quarters of a revolution, together with the disc 2, it will probably be chilled enough. If not, the disc may be stopped and kept in that position for a length of time sufficient to cool and solidify the body of soap contained in the duct. Thereafter the soap, still plastic but solidified, falls by gravity from the duct 8 from which the strip 10 has already been detached, and suitably guided passes to a cutting station at which by the special bow cutter 18 operating with reciprocal horizontal movements it is severed into bars.

Of course, as soon as the first amount of soap fed to the duct 8 has been cooled and has solidified, the wooden plug is removed and it will be unnecessary to use it again for all the time during which the machine is operating, inasmuch as the solidified body of soap coming out from the duct 8 constituted by itself a closing plug for the further quantities of liquid soap being fed to the duck 8.

Th cakes thus cut fall on a conveyor belt 19 which carries them to the successive station for stamping moulding or for the final drying and packing etc. The plant as described above offers remarkable advantages such as a great saving in operation due to the continuous functioning of the said plant; furthermore there are obtained cakes of soap of uniform and compact structure, without scrapped pieces.

What I claim is:

1. A plant for transforming soap in a liquid warm state into a compact chilled bar comprising a rotatably mounted motor driven disc like member provided at its periphery with an annular duct of channel section having a jacket enclosing the three sides thereof, an endless flexible sealing strip partly encircling and moving with the rotating annular duct so as to form therewith an arcuate refrigerating mould of rectangular cross section, a rotatable return pulley spaced from said disc like member, said strip having a jacket on its outer face and passing over said return pulley, means by which a refrigerant can be supplied to the jackets of the annular duct and of the strip comprising a shaft provided with axial ducts for the intake and discharge of the refrigerant, a pipe connected to said discharge duct, said disc like member being mounted on said shaft, a conduit connecting the intake duct to the jacket of the annular duct, a flexible conduit connecting the said jacket to the jacket of the sealing strip, and a further flexible conduit connecting the jacket of the sealing strip to said pipe, and means by which warm liquid soap can be introduced continuously to one end of the arcuate refrigerating mould, the arrangement and construction being such that when the disc like member is being rotated and refrigerant supplied to the jackets, the refrigerant will be circulated through the jackets of the annular duct and of the sealing strip, and warm liquid soap fed continuously under pressure to one end of the arcuate mould will be carried around by the disc like member, be cooled by contacttact with the three sides of the annular duct and by the strip contacting therewith, and be discharged from the other end of the arcuate mould in the form of a solidified bar.

2. A plant as claimed in claim 1 wherein the return pulley over which the sealing strip is passed is supported only at one side thereof so as to permit the free passage of the flexible conduits connected to the jacket of the flexible sealing strip.

3. A plant for transforming soap in a liquid warm state into a compact chilled bar comprising a rotatably mounted motor driven disc like member provided at its periphery with an annular duct of channel section having a jacket enclosing the three sides thereof, an endless flexible sealing strip partly encircling and moving with the rotating annular duct so as to form therewith an arcuate refrigerating mould of rectangular cross section, a rotatable pulley spaced from said disc like member, said strip including a strip of steel, a rubber jacket disposed on the outer face of said steel strip and sealed thereto fluid tightly, said strip passing over said pulley, means by which a refrigerant can be supplied to the jackets of the annular duct and of the strip, and means by which warm liquid soap can be introduced continuously to one end of the arcuate refrigerating mould, the arrangement and construction being such that the jackets warm liquid soap fed continuously under pressure to one end of the arcuate mould will be carried around by the disc like member, will be cooled by contact with the three sides of the annular duct and by the strip contacting therewith, and be discharged from the other end of the arcuate mould in the form of a solidified bar.

4. A plant for transforming soap in a liquid warm state into a compact chilled bar comprising a rotatably mounted motor driven disc like member provided at its periphery with an annular duct of channel section having a jacket enclosing the three sides thereof, an endless flexible sealing strip partly encircling and moving with the rotating annular duct so as to form therewith an arcuate refrigerating mould of rectangular cross section, a rotatable pulley spaced from said disc like member, said strip having a jacket on its outer face and passing over said pulley, means by which a refrigerant can be supplied to the jackets of the annular duct and of the strip, and means by which warm liquid soap can be introduced continuously to one end of the arcuate refrigerating mould, comprising a nozzle for feeding the liquid soap into the arcuate mould, said nozzle including a stationary feed pipe and a connecting member made of flexible material and tightly sealed at one side to said stationary feed pipe and on the other side, by pressure contact, to the inside walls of the annular duct and of the flexible sealing strip, the arrangement and construction being such that when the disc like member is being rotated and refrigerant supplied to the jackets warm liquid soap fed continuously under pressure to one end of the arcuate mould will be carried around by the disc like member, will be cooled by contact with the three sides of the annular duct and by the strip contacting therewith, and will be discharged from the other end of the arcuate mould in the form of a solidified bar.

5. A plant for transforming soap in a liquid warm state into a compact chilled bar, comprising a rotatably mounted motor driven disc like member provided at its periphery with an anular duct of channel section having a jacket enclosing the three sides thereof, an endless flexible sealing strip partly encircling and moving with the rotating annular duct so as to form therewith an arcuate refrigerating mould of rectangular cross section, a rotatable pulley spaced from said disc like member, said strip having a jacket on its outer face and passing over said pulley, means by which a refrigerant can be supplied to the jackets of the annular duct and of the strip, means by which warm liquid soap can be continuously introduced to one end of the arcuate refrigerating mould, the arrangement and construction being such that when the disc like member is being rotated and refrigerant supplied to the jackets warm liquid soap fed continuously under pressure to one end of the arcuate mould will be carried around by the disc like member, will be cooled by contact with the three sides of the annular duct and by the strip contacting therewith, and will be discharged from the other end of the arcuate mould in the form of a solidified bar, and a cutting device for cutting the solid soap bar into cakes, said cutting device being arranged to partake of a horizontal reciprocating movement.

References Cited in the file of this patent

UNITED STATES PATENTS

| | | |
|---|---|---|
| 810,193 | Daum | Jan. 16, 1906 |
| 1,118,503 | McLeod | Nov. 24, 1914 |
| 1,544,002 | Grove | June 30, 1925 |
| 2,659,948 | Properzi | Nov. 24, 1953 |
| 2,710,433 | Properzi | June 14, 1955 |
| 2,749,584 | Fey et al. | June 12, 1956 |

FOREIGN PATENTS

| | | |
|---|---|---|
| 609,098 | Great Britain | Sept. 24, 1948 |